Jan. 26, 1926.

N. T. McKEE

STEAM SEPARATOR

Filed June 20, 1923

1,570,907

Neal Trimble McKee INVENTOR.

BY
O. V. Thiele
his ATTORNEY.

Patented Jan. 26, 1926.

1,570,907

UNITED STATES PATENT OFFICE.

NEAL TRIMBLE McKEE, OF MOUNT VERNON, NEW YORK, ASSIGNOR TO THE SUPER-HEATER COMPANY, OF NEW YORK, N. Y.,

STEAM SEPARATOR.

Application filed June 20, 1923. Serial No. 646,531.

*To all whom it may concern:*

Be it known that I, NEAL TRIMBLE McKEE, citizen of the United States, and resident of Mount Vernon, in the county of Westchester and State of New York, have invented certain new and useful Improvements in Steam Separators, of which the following is a specification.

The invention forming the subject matter of the present application constitutes an improvement on the steam separator disclosed in my application No. 627,941 filed March 26th, 1923. The object of the present invention is to obviate certain objectionable features encountered in practice with the separator as disclosed in the former application.

Figure 1:
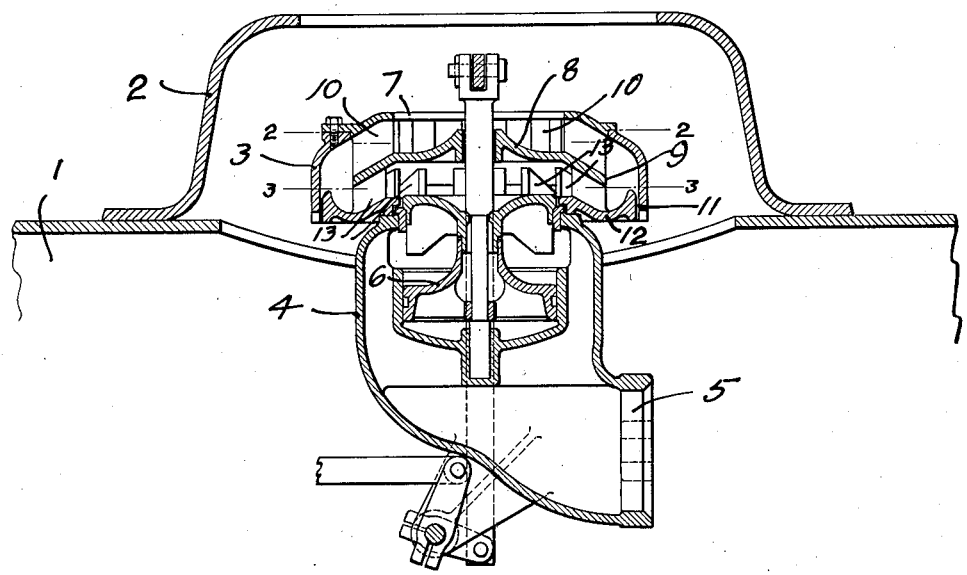
Figure 2:
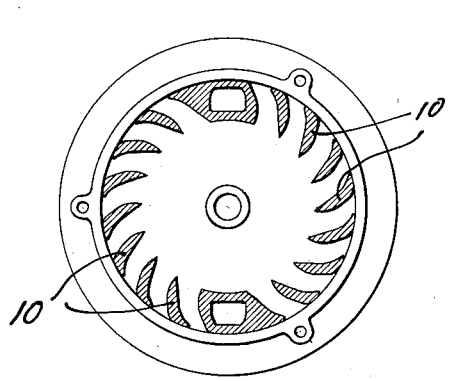
Figure 3:
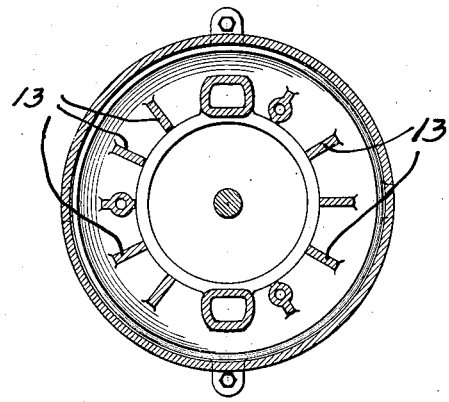

The invention is illustrated in the single sheet of drawings herewith, where Fig. 1 is a vertical, longitudinal, central section of the improved device, enough being shown of the locomotive boiler to make clear the location of my device within it; Fig. 2 is a section on line 2—2 of Fig. 1 and Fig. 3 one on line 3—3.

For purposes of illustration my invention is shown in a locomotive boiler, 1, of which 2 is the steam dome. My separator 3, is intimately associated with the throttle casing 4, from the outlet 5 of which steam is delivered to the dry-pipe in the ordinary manner. The throttle proper, 6, is of the balanced type, but as its form does not enter into my invention it will not be described.

Instead of allowing the steam to enter the throttle directly, with whatever moisture it contains, it is first led through the separator, which it enters at 7, and which it leaves at the lower end to flow directly into the throttle. Opposite the entrance 7 there is a baffle 8, whose outer edge 9 terminates some distance from the inner wall of the housing 3, the steam on its way to the throttle being thus forced to flow outward, around the edge 9, and then inward to the throttle. Spiral blades 10 give the steam a whirling motion during its outward travel, which motion causes drops of water carried in suspension by the steam to be thrown outward against the inner wall of the separator casing, whence they find their way back to the boiler through the annular opening 11 between the outer edge of bottom 12 of the separator and the lower portion of the circumferential wall.

As far as described this structure is like that disclosed in my above-named application. With such a separator it is found that the rapidly whirling steam, on rounding the outer edge 9 of baffle 8 and entering the throttle, does not at once lose this whirling component, but retains it, with the result that such motion is imparted to the throttle. This causes rapid wearing of the throttle and the surfaces engaged by it. By my invention this whirling motion of the throttle is stopped.

To this end I provide a second series of blades, 13, placed between the lower side of baffle 8 and the bottom 12 of the separator. These blades are shown as straight-sided and arranged radially, and their action is to straighten out the direction of the steam as it flows inward toward the throttle, so this flow becomes radial. Then as it enters the throttle casing it has no tangential component and has no tendency to impart a rotary motion to the throttle. Obviously the blades 13 may be shaped somewhat differently than I show them without losing my inventive idea. As long as they accomplish delivering the steam radially into the throttle my improvement is used. Other variations may also be made in practice without a loss of my inventive idea. For example the means I use by way of illustration to get rid of the water separated out of the steam may vary from those shown.

What I claim is:

1. In a device of the class described the combination of a casing having an opening at one end for the admission of steam in a direction parallel to the axis of the casing; means to deflect the steam outward from the axis and at the same time give it a rotary motion; a chamber wherein the steam moves in a rotary path and where any water is thereby separated out; means to permit the water so separated to leave the casing; a delivery conduit extending from the opposite end of the casing; and means between said chamber and said delivery conduit to remove the rotary component from the motion of the steam while passing toward the delivery conduit.

2. In a device of the class described the combination of a casing having an opening at one end for the admission of steam in a direction parallel to the axis of the casing; means to deflect the steam outward from the axis and at the same time give it a rotary motion; a chamber wherein the steam moves in a rotary path and where any water is thereby separated out; means to permit the water so separated to leave the casing; a delivery conduit extending axially from the end of the casing opposite the inlet; a throttle axially arranged in said delivery conduit; and means between said chamber and said delivery conduit to remove the rotary component from the motion of the steam while it is passing toward the delivery conduit.

3. In a device of the class described, the combination of a casing having an opening at one end for the admission of steam in a direction parallel to the axis of the casing; a baffle opposite the opening to deflect the steam laterally away from the axis; blades arranged between the casing and the baffle to give the steam a spiral motion; a chamber wherein the steam moves in a rotary path and where any water is thereby separated out; means permitting the water separated out to leave the casing; a delivery conduit to lead the steam from the bottom of the casing at a point opposite the inlet; and a second set of blades between the baffle and the bottom of the casing to deliver the steam to the outlet without any spiral component.

4. In a device of the class described, the combination of a casing having an opening at one end for the admission of steam in a direction parallel to the axis of the casing; a baffle opposite the opening to deflect the steam laterally away from the axis; blades arranged between the casing and the baffle to give the steam a spiral motion; a chamber wherein the steam moves in a rotary path and where any water is thereby separated out; means permitting the water separated out to leave the casing; a delivery conduit to lead the steam from the bottom of the casing at a point opposite the inlet; a throttle controlling said conduit; and a second set of blades between the baffle and the bottom of the casing to deliver the steam to the throttle without any spiral component.

5. In a separator, the combination of a casing 3, having at its top an inlet opening 7 and at its bottom 12 an outlet controlled by a throttle 6, a baffle between the inlet and the throttle, blades 10 radially arranged between the top of the casing and the baffle 8, and blades 13 radially arranged between the bottom 12 of the casing and the baffle 8, there being an outlet 11 to discharge water separated from the steam.

NEAL TRIMBLE McKEE.